US004001606B2

United States Statutory Invention Registration [19]

[11] Reg. Number: H1606

Gelnovatch et al.

[45] Published: Nov. 5, 1996

[54] ELECTRONIC QUASI-PASSIVE IDENTIFICATION SYSTEM

[75] Inventors: Vladimir G. Gelnovatch, Manasquan, N.J.; Bruce D. Jette, Springfield, Va.

[73] Assignee: The United States of America as represented by the Secretary of the Army, Washington, D.C.

[21] Appl. No.: 281,805

[22] Filed: Jul. 22, 1994

[51] Int. Cl.[6] ..... G01S 13/74

[52] U.S. Cl. ..... 340/505; 342/42; 342/51

[58] Field of Search ..... 340/825.54, 825.35, 340/572

[56] References Cited

U.S. PATENT DOCUMENTS

| | | | |
|---|---|---|---|
| 4,837,568 | 6/1989 | Snaper | 340/825.54 |
| 5,214,410 | 5/1993 | Verster | 340/572 |
| 5,347,263 | 8/1994 | Carroll et al. | 340/572 |
| 5,430,441 | 7/1995 | Bickley et al. | 340/825.54 |

*Primary Examiner*—Bernarr E. Gregory
*Attorney, Agent, or Firm*—Michael Zelenka; William H. Anderson; Roy E. Gordon

[57] ABSTRACT

A quasi-passive identification system having an interrogator and a passive transponder. The interrogator has a signal generator that generates radio-frequency energy under the control of a manual actuator. A preset encoder encodes the radio-frequency energy with an interrogation code to produce an interrogation signal that is radiated by an antenna. The transponder has an receiver for receiving the interrogation signal and separating it into received radio-frequency energy and a coded signal. A decoder decodes the coded signal and looks for a match between the coded signal and the interrogation code. A response transmitter, which is controlled by the decoder, encodes the received radio-frequency energy with the response code and radiates the response signal. When a receiver in the interrogator receives the response signal, the response signal is decoded and analyzed for a proper response. A response indicator is energized when a proper response is received.

17 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRONIC QUASI-PASSIVE IDENTIFICATION SYSTEM

GOVERNMENT INTEREST

The invention described herein may be manufactured, used and licensed by or for the Government for governmental purposes without the payment to us of any royalties thereon.

BACKGROUND OF THE INVENTION

1. Field of the Invention

This invention relates generally to the field of electronic communications. More particularly, the invention relates to electronic communication techniques for remote identification of objects.

2. Description of the Prior Art

In the field of electronic communications, a variety of remote interrogation techniques have been used to achieve positive identification of objects. Existing electronic interrogation techniques often consist of transmitting a radio-frequency (rf) signal that is intended to trigger a transponder or like device to elicit an electromagnetic reply. Such interrogation techniques have been used extensively by the military for identifying friendly forces and by aircraft controlers for identifyiny commercial aircraft.

More specifically, a typical military identification-friend-or-foe (IFF) system uses coded radio transmissions that friendly forces automatically respond to by emitting a coded response signal, which identifies them from enemy forces. A transmitter-receiver device, usually called an interrogator-responser or simply an interrogator, transmits the coded radio transmissions toward a target as an interrogation signal and receives the coded response signal. The equipment carried by the friendly forces usually includes a transponder having a circuit that is triggered by a received interrogation signal to automatically transmit the appropriate response signal, which positively identifies the target as being friendly.

In addition to IFF systems, achieving remote positive identification of objects is also becoming an important problem in such diverse areas as inventory control, physical security and retail pricing. For example, the inability to accurately make positive identification of objects can cost industry dearly by loses due to pilferage and theft, or because of increased inventory control costs. In this regard, warehousing requires at least two-dimensional, often three-dimensional placement of supplies. Categorizing regions of a warehouse usually allows simpler location and control of items, but does not necessarily use space efficiently. On the other hand, "plugging in" the next item to be stored in any available space can provide efficient use of the warehouse area but can cause problems in inventory and item location. As such, most prior art storage procedures require periodic inventory to correct errors in records or account for pilferage. Bar code systems currently provide a reasonably efficient method of conducting inventory but they still require the physical checking of pallets, packages, stacks, etc. Most prior inventory systems require restacking checked items to confirm the number of sub-units or boxed items in a particular batch. These labor intensive, prior art inventory techniques can be highly expensive to procure and time consuming to use properly.

Current security systems usually require the use of guards, electronic identification cards, combination locks, etc. to control personnel access to or egress from property.

The use of coded cards and cipher locks, and the need to stop personnel to check their identification cards can decrease employee performance through inconvenience and loss of employee flexibility. When an employee needs to enter a new area, complex, time consuming security steps are usually required. At present, there is no inexpensive, easy method of learning who is present in a large area. Additionally, most property protection systems decouple the functions of security from those of personnel monitoring. Consequently, current personnel access systems are usually expensive to install, inconvenient to use, and difficult to maintain.

For industry and government, loss of property through pilferage, theft, and damage poses a major problem. To prevent removal of small items such as personal computers, heavy cables often anchor the items to desks, walls, or other large stationary objects. Although this approach is usually effective, it restricts rearranging office furniture, makes it difficult to exchange equipment and causes an unsightly appearance.

In most current systems for protecting warehouse inventory, stored items are easily inventoried, but items being removed are not easily monitored. Consequently, items often leave a warehouse without being detected. As mentioned above, this weakness often results from decoupling personnel monitoring and inventory monitoring. Prior art systems that address only one security problem are frequently circumvented, while those security systems that do work are usually inconvenient to use.

Bar coding has greatly improved the control of inventory at the point of sale. Items of a specific category can be deducted from stock, correct pricing ensured and errors in entry reduced. Shortcomings of such systems are the limited number of codes that can be put in the bar and the bar orientation requirement that the scanner see the bar. With the large number of products available on the market, the code limit is a significant problem. Also, anyone who has waited at a checkout as the cashier attempted to get a good scan can attest to the inconvenience of the marking-scanner alignment requirement.

In a problem related to retail pricing, admission or passage fees are presently collected using inconvenient or expensive techniques. Parkway or turnpike fees are often collected by stopping the car, collecting cash, providing change, and allowing the driver to proceed. This process often causes traffic jams during peak hours and higher tolls to pay toll collector salaries.

"Friendly fire" has been the cause of many losses during combat. The "fog" of war induced by adverse weather, obscurants, long stand-off ranges for weapon systems and actions while under stress often cause the inadvertent discharge of weapons against friendly units. Expensive Navy systems, such as aircraft and ships, use active interrogator identification of a "boggie" (unknown) before weapons are employed. However, no similar system is available for smaller objects, such as tanks, trucks, infantry fighting vehicles, and, perhaps most important, soldiers themselves. Some simple, prior art identification systems use thermal tape markings, light emitting diodes and other visual signals. These marking techniques are easily mimicked. Additionally, ground clutter and purposeful camouflage often prevent full employment of current and developing systems.

SUMMARY OF THE INVENTION

The general purpose of this invention is to provide a remote positive identification system that can be economically employed for identifying relatively small objects in a limited area. To attain this, the present invention contemplates a system having a unique active source interrogator and a passive transponder, whereby detailed interrogator and transponder encoding can be used for multiple identifications. The passive transponder of the present invention uses its received power to passively provide appropriate response signals. The transponder, being inexpensive, small and light weight, can be mounted in or on a variety objects to provide specific identification thereof.

Broadly, the present invention is directed to a quasi-passive identification system comprising an interrogator and a transponder. The interrogator has a signal generator that generates rf energy. An encoder encodes the rf energy with an interrogation code to produce an interrogation signal. An interrogation transmitter radiates the interrogation signal while a receiver receives a rf radiation.

The transponder has an interrogation receiver, which receives rf radiation and separates it into received rf energy and a coded signal. A decoder decodes the coded signal to look for the interrogation code. Under the control of the decoder, a response transmitter encodes the received rf energy with a response code and radiates the response signal.

More specifically, the invention is directed to a quasi-passive identification system having an active interrogator and a passive transponder. The interrogator has a signal generator that generates rf energy under the control of a manual actuator. A preset encoder encodes the rf energy with an interrogation code to produce an interrogation signal that is radiated by an antenna. The transponder has an receiver for receiving the interrogation signal and separating it into received rf energy and a coded signal. A decoder decodes the coded signal and looks for a match between the coded signal and the interrogation code. A response transmitter that is controlled by the decoder encodes the received radio-frequency energy with the response code and radiates the response signal. When a receiver in the interrogator receives the response signal, the response signal is decoded and analyzed for a proper response. A response indicator is energized when a proper response is received.

The exact nature of this invention and other objects and advantages thereof will be readily apparent from consideration of the following specification relating to the annexed drawing.

DETAILED DESCRIPTION OF THE PREFERRED EMBODIMENTS

Figure 1:
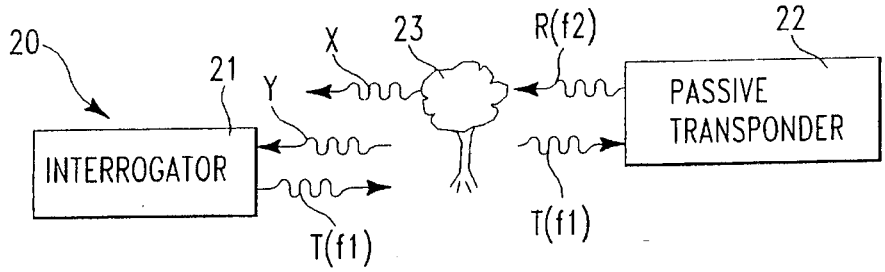
FIG. 1 is a schematic representation of a preferred embodiment of a electronic quasi-passive identification system according to the present invention.

The drawings show quasi-passive identification system 20 containing interrogator 21 and passive transponder 22. FIG. 1 depicts interrogator 21 transmitting interrogation signal T(f1). Passive transponder 22 receives interrogation signal T(f1) and replies by transmitting response signal R(f2). Environmental objects, such as tree 23, can reflect interrogation signal T(f1). FIG. 1 depicts these reflections as signal X. Interrogator 21 receives signal Y, generally composed of response signal R(f2) and reflected signals X. Interrogator 21 analyzes signal Y to detect the presence of transponder response signal R(f2).

Figure 2:
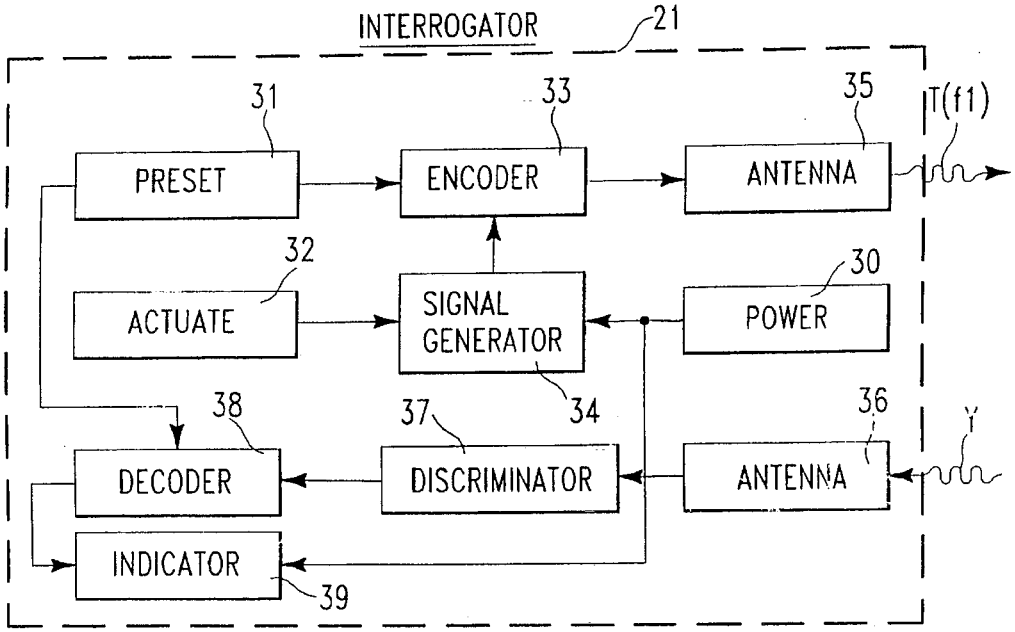
FIG. 2 is a schematic representation of a portion of the system of FIG. 1, showing the interrogator in greater detail.

FIG. 2 shows interrogator 21 in greater detail. Interrogator 21 includes power source 30, preset device 31, and actuate device 32. One output of preset device 31 connects to a code setting input terminal of encoder 33. The other output of preset device 31 connects to a code setting input terminal of decoder 38. The output of actuate device 32 connects to a trigger input terminal of microwave signal generator 34. The output of signal generator 34 connects to a signal input terminal of encoder 33. Power source 30 provides power to microwave signal generator 34. The signal output terminal of encoder 33 feeds transmitting antenna 35 which transmits interrogation signal T(f1).

Receiving antenna 36 feeds received microwave signals, such as signal Y, to a signal input terminal of discriminator 37. The output of discriminator 37 inputs decoder 38. Discriminator 37 separates the modulated portions of response signal R(f2), if present, from signal Y and delivers it to decoder 38 where it is compared to the preset code stored therein. The output of decoder 38 connects to indicator 39, which may be a conventional audio and/or visual signaling device. Power source 30 provides operating power to indicator 39.

Figure 3:
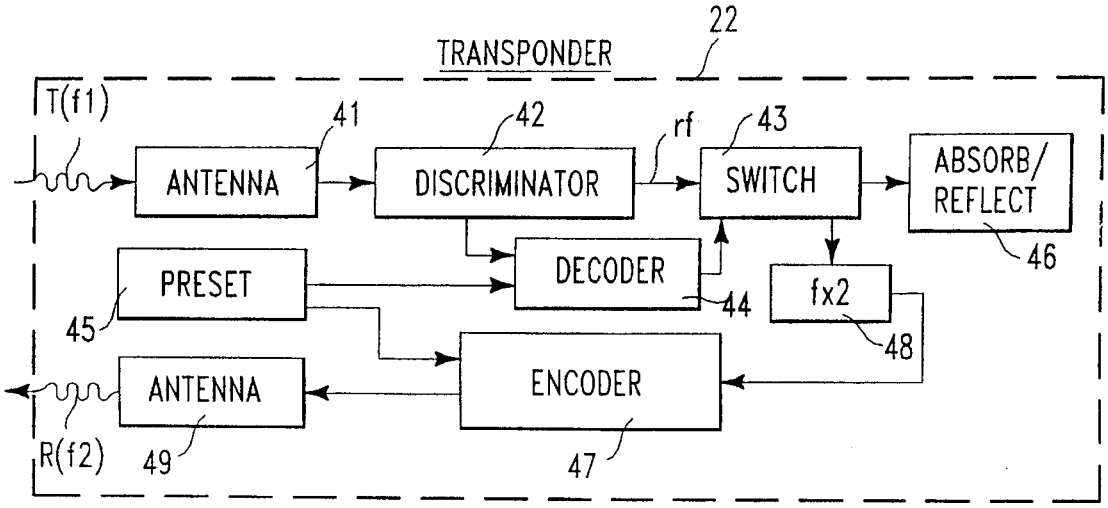
FIG. 3 is a schematic representation of a portion of the system of FIG. 1, showing the transponder in greater detail.

Transponder 22, shown in detail in FIG. 3, includes receive antenna 41, which feeds received microwave energy to a signal input terminal of discriminator 42. An rf output line from discriminator 42 connects to an input of rf transmission switch 43, which is controlled by a control output signal from decoder 44. A signal input terminal of decoder 44 receives the detected output signal of discriminator 42. Preset device 45 connects to a code setting input terminal of decoder 44.

Under the control of decoder 44, rf transmission switch 43 transmits the rf output (carrier signal) of discriminator 42 to either absorb/reflect device 46 or to a signal input of encoder 47 via frequency doubler 48. A code setting input terminal of encoder 47 connects to preset device 45. The output of encoder 47 feeds transmit antenna 49, which transmits the encoded output of encoder 47 as response signal R(f2).

As disclosed above, quasi-passive identification system 20 may be used in a variety of situations to achieve remote positive identification of objects and personnel. System 20 may be employed in a number of diverse environments, ranging from inventory control to IFF. To illustrate its operation, system 20 is first described as an IFF apparatus for use by an individual soldier in a battlefield setting.

When used for IFF by individual soldiers, the present invention contemplates that the circuits of interrogator 21 and transponder 22 be fabricated, using conventional techniques, as relatively small packages that may be easily carried on ones person. For example, interrogator 21 may be a device about the size of a small, digital wrist watch, which may be strapped to an individual's wrist. The circuits of transponder 22 are preferably housed in a thin plastic cover about the size of a typical credit card. As such, a user may carry transponder 22 along with other identification suspended from a necklace, in a wallet or a purse, or concealed in equipment such as a helmet.

Initially, a user must first prepare interrogator 21 by manually operating preset device 31 to insert a prearranged interrogation code into encoder 33 and reply code into decoder 38. Likewise, the user prepares transponder 22 by manually operating preset device 45 to insert the same prearranged interrogation code into decoder 44 and reply code into encoder 47. A number of data entry devices for use in preset devices 31 and 45 are available in the prior art. For example, such devices may be implemented using conventional key pad mechanisms capable of outputting alphanumeric data by simple key depressions. The user would then make code settings via simple key depressions.

Actuate device 32, which functions to trigger microwave signal generator 34, may also include a manually operated mechanism such as a key. This key may be incorporated as an integral part of the conventional key pad mechanism used to implement preset device 31.

Using interrogator 21, an agressor performs an IFF interrogation by operating actuate device 32 while monitoring indicator 39 for a correct response. When actuate device 32 is operated, signal generator 34, which derives it power from power source 30, generates a microwave signal at frequency f1. Encoder 33 receives the generated microwave signal and modulates it in accordance with the preset interrogation code stored therein. The encoded signal is then fed from encoder 33 to antenna 35 for transmission as interrogation signal T(f1).

As indicated above, friendly transponder 22 has the prearranged interrogation and reply codes preset in its decoder 44 and encoder 47, respectively, via preset device 45. Antenna 41 of transponder 22 receives interrogation signal T(f1) and feeds it to discriminator 42. Discriminator 42 separates signal T(f1) into a detected code signal and a microwave carrier at frequency f1. The carrier is passed to the rf input of switch 43 while the detected code signal is passed to decoder 44.

Initially, switch 43 transmits its rf input signal to absorb/reflect device 46 until such time that a coded match is found by decoder 44. While decoder 44 looks for a match, absorb/reflect device 46 passively dissipates the non-matching microwave energy outputted by discriminator 42. When a match is detected, encoder 44 operates switch 43 to transmit the rf microwave power from discriminator 42 to frequency doubler 48, which doubles the frequency from (f1) to (f2). Encoder 47 uses the microwave power at frequency (f2) as a carrier and modulates it in accordance with the preselected response code preset in encoder 47. Encoder 47 feeds the modulated signal to antenna 49 which transmits it as response signal R(f2). It is noted that on each interrogation, transmitted signal T(f1) repeats the interrogation code several times, giving decoder 44 sufficient time to perform its function and look for a match.

Meanwhile, composite signal Y, which may include response signal R(f2) as well as other energy such as reflected signals X, is being received by interrogator 21. Antenna 36 feeds signal Y to discriminator 37, which separates energy at frequency (f2) from signal Y and demodulates it to detect the coded modulation. Decoder 38 receives the coded modulation from the output of discriminator 37 and decodes it. Decoder 38 looks for a match between the coded modulation and the response code stored therein. When a match is found, decoder 38 energizes indicator 39 to signal the reception of a proper response from friendly transponder 22. Indicator 39 may include a buzzer, a light, or an alphanumeric display device that can store and display response codes.

When an aggressor's interrogator 21 is energized via actuate device 32, it essentially "asks" a target if it is friend or foe by emitting interrogation signal T(f1) with a predetermined format. It is contemplated that the wavelength, phase, duration and modulation of signals T(f1) and R(f2) could be made dependent on the day's coding sequence and perhaps other factors such as time of day. The output power of interrogator 21 can be limited to ensure that only targets within a specified range respond. The use of a directional antenna for antenna 35 can further insure that responses only come from those objects targeted.

Transponder 22 receives the transmitted signal T(f1) and uses decoder 44 to see if a response is warranted. If not, the received power is dissipated, i.e., absorbed or reflected, by absorb/reflect device 46. In this case, transponder 22, being a passive device with no internal power source, will produce no special signature and will respond in a manner similar to of background objects such as tree 23. This feature prevents an enemy from searching an area with electromagnetic radiation to find transponders 22.

If a friendly interrogation signal T(f1) was detected by decoder 44, the received signal would be doubled in frequency doubler 48 to frequency (f2) and modulated by encoder 47 with a friendly response code, which could include a personal identification (ID) number unique to the responding object. The response signal R(f2) would then be returned via antenna 49 back to the interrogating source. Even when making a positive response, transponder 22 would radiate only as much power as interrogator 21 sent to it. Hence, system 20 is quasi-passive. Response signal R(f2) is returned only at the power levels interrogator 21 would see from any reasonably reflective object in the area such as tree 23.

Next, interrogator 21 would receive response signal R(f2) and decode it in decoder 38, learning of a friendly response. In a limited theater of operation, the acceptable ID codes could be stored to compare them for later confirmation. It is contemplated that transponder 22, which requires no internal power, would be about the size of an ID card. Interrogator 21 could range in size from being only a few inches square to much larger, depending on its range. Interrogator 21 could be mounted on a rifle, a personnel vehicle, a tank or an aircraft. Also, circuitry could be added to transponder 22 which would indicate to the bearer that it had been interrogated.

Additionally, since system 20 can be used to monitor individuals, it can be equally useful for monitoring other items, such as equipment located at a construction site, items stored in a warehouse, objects found in an office building, etc. Transponders 22 can be extremely inexpensive, small and light weight. As such, they could be attached to retail items and economically used for security, inventory control and cashier check out. In security applications, individual serial numbers may be preset as codes into each transponder 22 so that it uniquely identifies the specific item on which it is mounted. When the items are stored in a warehouse or at a retail display, the transponders 22 may be periodically, randomly or continuously monitored for inventory control. At the check-out counter, the cashier's pricing equipment may also include an interrogator 21 which would interrogate transponder 22 to determine its serial number or other ID for use in verifying its price and controling inventory. Where items are randomly stored in a large area, such as a warehouse, an interrogator 21 having a directional receiving antenna 36 may be used to locate the general direction of a responding transponder 22.

Microwave radiation allows system 20 to operate without interference from many packaging materials. Therefore, transponder 22 can be put on or in a package and interrogated without opening the package or directly viewing the item. At cashier counters, transponders 22 may be interrogated without having to orient the item in a particular manner in direct sight of a scanner. The cashier would only have to pass the item near or through a detector.

Transponder 22 may also be used as an ID security badge. Such badges are often used to allow access to certain areas. An ID badge having a transponder 22 with a personal code stored therein may be used to unlock doors. If such a badge is lost, a new badge with a new personal code could be immediately issued and the old personal code removed from the system. The same system could be used to track the movement of employees in a large office building.

It should be understood, of course, that the foregoing disclosure relates to only preferred embodiments of the invention and that numerous other modifications or alterations may be made therein without departing from the spirit and the scope of the invention as set forth in the appended claims.

What is claimed is:

1. A quasi-passive identification system comprising:

an interrogator having a signal generator means for generating radio-frequency energy, an interrogation encoder means for encoding said radio-frequency energy with an interrogation code to produce an interrogation signal, an interrogation transmit means for radiating said interrogation signal, and a response receive means for receiving radio-frequency signals; and a transponder having an interrogation receive means for receiving radio-frequency signals and separating said radio-frequency signals into received radio-frequency energy and a coded signal, an interrogation decoder means for decoding said coded signal, and a response transmit means controlled by said interrogation decoder means for encoding said received radio-frequency energy with a response code to produce said response signal and for radiating said response signal.

2. The system of claim 1 wherein said interrogator includes an actuate means for triggering said interrogator to radiate said interrogation signal.

3. The system of claim 2 wherein said actuate means is connected to said signal generator means for permitting manual actuation of said interrogator by energizing said signal generator means.

4. The system of claim 1 wherein said response receive means includes a response decoder means for decoding said received radio-frequency signals to detect the presence of said response code therein.

5. The system of claim 4 wherein said interrogator includes a preset means for inputting said interrogation code into said interrogation encoder means and for inputting said response code into said response decoder means.

6. The system of claim 5 wherein said interrogator further includes an indicator means responsive to said response decoder means for indicating the presence of said response code.

7. The system of claim 6 wherein said interrogator includes an actuate means for triggering said interrogator to radiate said interrogation signal.

8. The system of claim 7 wherein said actuate means is connected to said signal generator means for permitting manual actuation of said interrogator by energizing said signal generator means.

9. The system of claim 8 wherein said transponder includes an energy dissipation means, and said response transmit means includes a radio-frequency transmission switch means responsive to said interrogation decoder means for transmitting said received radio-frequency energy to said energy dissipation means when a predetermined interrogation signal is not detected by said interrogation decoder means.

10. The system of claim 9 wherein said response transmit means further includes a frequency shift means connected to said switch means for changing the frequency of said radio-frequency energy before encoding said received radio-frequency energy with a response code.

11. The system of claim 10 wherein said frequency shift means is a frequency doubler.

12. The system of claim 11 wherein said transponder includes a preset means for inputting said interrogation code into said interrogation decoder means and for inputting said response code into said response encoder means.

13. A passive transponder, for use in responding to a radio-frequency input signal modulated with a proper interrogation code, comprising:

a receive means for receiving radio-frequency input signals and separating said input signals into radio-frequency energy and a coded signal;

a decoder means connected to said receive means for decoding said coded signal and producing an output if said coded signal matches said interrogation code; and a transmit means responsive to said output of said decoder means for encoding said radio-frequency energy with a response code and for radiating said energy as a response signal.

14. The transponder of claim 13 further including an energy dissipation means, and wherein said transmit means includes a radio-frequency transmission switch means for transmitting said radio-frequency energy to said energy dissipation means when said coded signal does not match said interrogation code.

15. The transponder of claim 14 wherein said transmit means further includes a frequency shift means connected to said switch means for changing the frequency of said radio-frequency energy before encoding said received radio-frequency energy with a response code.

16. The transponder of claim 15 wherein said frequency shift means is a frequency doubler.

17. The transponder of claim 16 further including a preset means for inputting said interrogation code into said decoder means and for inputting said response code into said transmit means.

* * * * *